United States Patent
Rennig

[19]

[11] Patent Number: 6,078,620
[45] Date of Patent: Jun. 20, 2000

[54] METHOD AND APPARATUS FOR PERFORMING ADAPTIVE DIFFERENTIAL PULSE CODE MODULATION

[75] Inventor: Fred S. Rennig, Emmaus, Pa.

[73] Assignee: Lucent Technologies, Inc., Murray Hill, N.J.

[21] Appl. No.: 08/903,886

[22] Filed: Jul. 31, 1997

[51] Int. Cl.[7] .................................................. H04B 14/06
[52] U.S. Cl. ........................... 375/244; 375/372; 341/143
[58] Field of Search ..................... 375/241, 242, 375/244, 245, 372; 341/143; 348/410

[56] References Cited

U.S. PATENT DOCUMENTS

| | | | |
|---|---|---|---|
| 4,891,754 | 1/1990 | Boreland | 712/245 |
| 5,455,841 | 10/1995 | Hazu | 375/240 |
| 5,467,372 | 11/1995 | Nishitani | 375/244 |
| 5,600,674 | 2/1997 | Bonet et al. | 375/244 |
| 5,799,039 | 8/1998 | Laird et al. | 375/244 |
| 5,838,597 | 11/1998 | Pau et al. | 308/203 |

OTHER PUBLICATIONS

General Apsects of Digital Transmission Systems; Terminal Equipments 40, 32, 24, 16 kbit/s Adaptive Differential Pulse Code Modulation (ADPCM) Recommendation G.726 by The Internation Telephone and Telegraph Consultative Committee (CCITT).

*Primary Examiner*—Young T. Tse
*Attorney, Agent, or Firm*—Synnestvedt & Lechner LLP

[57] ABSTRACT

A method and apparatus for performing adaptive differential pulse code modulation. The method and apparatus is particularly adapted for compliance with the ITU-T G.726 international standard. Certain intermediate values, including Y and SE, needed to compress or decompress a given sample are pre-calculated prior to receipt of the actual sample to which they correspond. Accordingly, when the sample is received, intermediate variables Y and SE are essentially immediately available. This allows the output value SR (during a decompression cycle) or I (during a compression cycle) to be available one clock cycle after receipt of a sample. The remaining clock cycles corresponding to that sample period are used to precalculate the intermediate variables Y and SE for the next sample. The method and apparatus requires only fifteen clock cycles per conversion.

25 Claims, 5 Drawing Sheets

FIG. 5

1) LOAD PREVIOUSLY CALCULATED NUMBERS PLUS I, DQ, SR INTO REGISTERS.

2) TRANS (TD, YL, DQ) → TR

3) TRIGB (TR, UPB (B6, DQ, XOR (DQ, DQ6))) → B6a

4) B6a → B6 ; DQ5 → DQ6
   FMULT (B6, DQ5) → ACCUM
   TRIGB (TR, UPB (B5, DQ, XOR (DQ, DQ5))) → B5a

5) B5a → B5 ; DQ4 → DQ5
   FMULT (B5, DQ4) → ACCUM
   TRIGB (TR, UPB (B4, DQ, XOR (DQ, DQ4))) → B4a

6) B4a → B4 ; DQ3 → DQ4
   FMULT (B4, DQ3) → ACCUM
   TRIGB (TR, UPB (B3, DQ, XOR (DQ, DQ3))) → B3a

7) B3a → B3 ; DQ2 → DQ3
   FMULT (B3, DQ2) → ACCUM
   TRIGB (TR, UPB (B2, DQ, XOR (DQ, DQ2))) → B2a

8) B2a → B2 ; DQ1 → DQ2
   FMULT (B2, DQ1) → ACCUM
   TRIGB (TR, UPB (B1, DQ, XOR (DQ, DQ1))) → B1a

9) B1a → B1 ; FLOAT (DQ0) → DQ1
   FMULT (B1, DQ0) → ACCUM
   ADDC (SEZ (VALUE FROM PREVIOUS SAMPLE), DQ)    PK0, SIGPK

10) ACCUM → SEZ (FOR NEXT SAMPLE)

11) CALCULATE NEW A2 (= OLD A2R) FROM OLD A2, SIGPK, PK0, PK1, PK2, TR
    CALCULATE NEW A1 (= OLD A1R) FROM OLD A1, SIGPK, PK0, PK1, TR
    FMULT (A2R, SR1) → WA2 (FOR NEXT SAMPLE)
    PK0 → PK1 ; PK1 → PK2

12) SR0 → SR1
    FMULT (A1R, SR0)) → WA1 (FOR NEXT SAMPLE)
    FUNCTF (I) → FIa
    FILTA (DMS, FIa) → DMS (NEXT SAMPLE);
    FILTA (DML, FIa) → DML (NEXT SAMPLE);

13) CALCULATE AP AND AL FROM DMS, DML, Y, TDP, TR

14) LIMB (FILTD (Y, FUNCTW (I))) → YUPa
    FILTE (YUPa, YL) → YLP (YL FOR NEXT SAMPLE)
    MIX (YUP, YLP, LIMA (AP)) → Ya (FOR NEXT SAMPLE)

15) ACCUM → SE ; TRIGB (TDP, TR) → TD (FOR NEXT SAMPLE)
    Ya → Y

METHOD AND APPARATUS FOR PERFORMING ADAPTIVE DIFFERENTIAL PULSE CODE MODULATION

FIELD OF THE INVENTION

The invention pertains to a digital signal processor for performing adaptive differential pulse code modulation. More particularly, the invention pertains to a method and apparatus for performing adaptive differential pulse code modulation in conformity with international telecommunications standard ITU-T G.726.

BACKGROUND OF THE INVENTION

Adaptive differential pulse code modulation (ADPCM) is a widely used method of compressing digital speech signals in the telecommunications industry. The International Telegraph and Telephone Consultative Committee (CCITT) set forth international standard G.726 for ADPCM to provide a uniform protocol for digital telecommunication throughout the world. The CCITT has recently changed its name to the International Telecommunication Union (ITU) and, accordingly, the standard is now more correctly referred to as the ITU-T (ITU-Telecommunications) G.726 standard.

A channel of digital telephonic speech communication typically comprises 64 Kbits/sec. This rate is dictated by the fact that the analog speech is sampled at a rate of 8 KHz, with each sample being 8 bits in length (i.e., 256 level quantization). In accordance with the standard, the 64 Kbits/sec. digital data stream can be compressed to any one of 40 Kbits/sec., 32 Kbits/sec., 24 Kbits/sec. or 16 Kbits/sec., i.e., each 8 bit sample can be compressed to 5, 4, 3, or 2 bits.

The ITU-T G.726 standard sets forth the mathematical operations that must be performed to encode or decode a digital signal in accordance with the standard. However, it leaves the actual implementation to the discretion of designers of telecommunications equipment.

The complete operation is set forth in detail in the ITU-T G.726 standard, which is incorporated herein by reference. In accordance with ITU-T G.726, the original uncompressed digital sample is termed S, the decompressed version of an incoming compressed signal is referred to as SD, and the compressed signal is termed I regardless of whether it is an incoming signal which is being decompressed or a outgoing signal which has just been compressed from the original signal S. In this specification, the terms I(receive) and I(transmit) will be used to differentiate, when necessary, between an incoming compressed signal which is to be decompressed and an outgoing signal which has just been compressed.

The encode (compression) and decode (decompression) operations under ITU-T G.726 comprise a significant amount of substantially identical operations. Particularly, both include essentially the same feedback loop. Accordingly, many of the intermediate variables needed for compression and decompression are the same.

In ADPCM, the compressed bit pattern, I, is determined as a function, not only of the instant 8 bit sample which is being compressed, but also of all previous samples. ADPCM is a predictive algorithm in which an estimate of the present sample is predicted based on previous samples. The signal estimate, termed SE under ITU-T G.726, is subtracted from the actual signal to derive the encoded value I or the decoded value SD, as the case may be.

An apparatus for performing ADPCM can be constructed in the programmable environment, for example, such as a programmed digital signal processor (DSP). It also may be implemented entirely in hardware or any combination of hardware and software. Known hardware implementations require a substantial number of clock cycles to perform the complete encode or decode operation. In particular, some known hardware implementations of ITU-T G.726 require up to about 130 clock cycles per sample conversion. Accordingly, such hardware implementations require high clock speeds and, therefore, have significant power requirements. For instance, an algorithm which requires 130 clock cycles to perform a conversion in conformity with ITU-T G.726 must operate at a minimum speed of 8 Kbits/sec.×130 clock cycles=1.04 MHz per channel.

Most programmable environment solutions are area extensive in terms of both required memory space and hardware area.

Another problem with certain prior art implementations of G.726 (particularly hardware implementations) is that they require multiple sets of the hardware to handle multiple channels of data. Thus, for instance, a full duplex telephone implementation would require 2 sets of essentially identical hardware, one to decompress received compressed data and another for compressing uncompressed data for transmission. Accordingly, increasing the number of channels increases expense, area, and complexity.

Accordingly, it is an object of the present invention to provide an improved method and apparatus for implementing adaptive differential pulse code modulation.

It is another object of the present invention to provide a method and apparatus for performing ADPCM in a minimal number of clock cycles per conversion.

It is a further object of the present invention to provide an improved method and apparatus for performing adaptive differential pulse code modulation in accordance with the ITU-T G.726 international standard.

SUMMARY OF THE INVENTION

In accordance with the invention, an apparatus for implementing adaptive differential pulse code modulation includes a processor for performing arithmetic and logical operations, a buffer memory, such as a dual port random access memory (RAM), a controller such as a finite state machine for controlling the processor and memory, and read and write addressing units under control of the controller for pointing to specific addresses in the memory. The processor, under control of the controller, performs all of the arithmetic and logic operation to implement the ADPCM conversion. The invention is particularly adapted to perform ADPCM in accordance with the ITU-T G.726 international standard.

Essentially all intermediate variables which need to be generated in accordance with the G.726 standard to derive the encoded or decoded bit pattern are calculated during the pass through the conversion operation corresponding in time to the preceding sample. In a preferred embodiment, the controller is a finite state machine and the state machine requires only fifteen states, i.e., fifteen clock cycles per conversion. The encoded or decoded output bit pattern is generated within one cycle/state of the receipt of the input sample for each conversion operation. The remaining clock cycles (or states), e.g., states 2 through 15, are used to determine intermediate values SE (sample estimate) and Y (quantizer scale factor), inter alia, for the next sample which has not been received yet. Accordingly, during the present pass through the conversion operation starting immediately following receipt of a sample, intermediate variables Y and SE are already available during the very first clock cycle.

The use of a dual port RAM as the buffer memory allows both a write and read from the memory during a single clock cycle. This feature helps minimize the overall required number of clock cycles needed per conversion.

The use of a dual port RAM also allows for a single hardware setup to be used for any number of data channels. No modification of the hardware is needed to adapt to multiple channel use. It only is necessary for the dual port RAM to have sufficient space to store, for all of the channels, the intermediate values which are generated during one pass through the complete conversion operation, but which are needed for the next pass for the corresponding channel, e.g., SE and Y, for multiple channels simultaneously.

The architecture of the device of the invention comprises a synchronous portion and an asynchronous portion. The asynchronous portion primarily generates the ultimate output signal, I or SD (depending on whether it is performing a compression or a decompression, respectively), as well as intermediate values SR and DQ. In order to create all of these signals, the asynchronous portion requires intermediate values Y and SE which are generated by the synchronous portion of the apparatus. The synchronous portion of the circuit, however, requires from the asynchronous circuit portion intermediate values SR and DQ as well as I to generate SE and Y.

The variables Y and SE needed by the asynchronous portion of the circuit are the Y and SE values for the present sample which have been generated and stored during the preceding conversion. Accordingly, they already are available at the beginning of the corresponding conversion. This allows the output signal I or SR to be generated and available within one cycle of receipt of the corresponding sample.

Further, the method and apparatus allows for operation from any start-up condition and does not require a reset state. However, it can be set to a reset state in accordance with the UTI-T G.726 international standard.

BRIEF DESCRIPTION OF THE DRAWINGS

FIG. 5 is a flow diagram of adaptive differential pulse code modulation in accordance with the present invention.

DETAILED DESCRIPTION OF PREFERRED EMBODIMENTS IN ACCORDANCE WITH THE PRESENT INVENTION

Figure 1A:
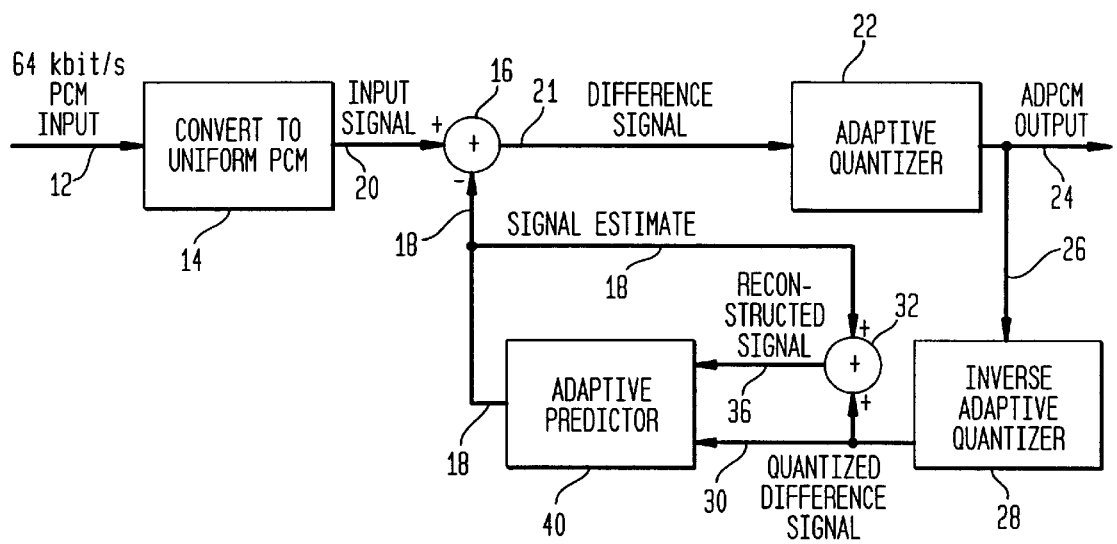
FIG. 1A is a block diagram illustrating the compression (or encode) operation in accordance with the G.726 international ADPCM standard.

FIG. 1A is a simplified block diagram illustrating adaptive differential pulse code modulation (ADPCM) encoding in accordance with the ITU-T G.726 international standard (hereinafter the Standard). A 64 Kbit/sec. pulse code modulated input signal 12 is converted in block 14 to uniform pulse code modulation format. Particularly, in accordance with the Standard, the incoming signal may be an 8 bit A-law or µ-law PCM sample signal. Accordingly, in block 14, it is determined whether the incoming signal is in A-law or µ-law format and either format is converted to uniform PCM format. In block 16, a feedback signal 18 comprising an estimate of input signal 12 is subtracted from the uniform PCM format signal 20 to generate a difference signal 21.

An adaptive quantizer 22 assigns a code to the value of the 8 bit difference signal 21. This code 26 is the ADPCM encoded output. In accordance with the Standard, the adaptive quantizer output code is a 5, 4, 3, or 2 bit code, depending on the particular compression level chosen by the designer. Accordingly, the adaptive quantizer is selectively a 31, 15, 7, or 4 level quantizer. More specifically, the adaptive quantizer 22, converts the difference signal 21 to base 2 logarithmic and scales it by y(k), which is computed by the scale factor adaptation block 44 as described further below in connection with FIG. 2. The normalized input/output characteristic of the quantizer 22 is defined in tables 1/G.726 through 4/G.726 of the Standard, to which reference should be made for greater detail.

Not only is the output 26 of the adaptive quantizer the encoded output signal, but also the entry point of the feedback loop which generated the above-mentioned signal estimate 18. In the feedback loop, an inverse quantizer 28 produces a quantized difference signal 30 from the 5, 4, 3, or 2 bit signal 26 by scaling specific values selected from the normalized quantizing characteristic given in tables 1/G.726 through 4/G.726 using the signal y(k) (to be discussed more fully below) and then transforming the result from the logarithmic domain. The quantized difference signal 30 generated by inverse quantizer 28 is added in block 32 to the signal estimate 18 to generate a reconstructed signal 36. Then, both the reconstructed signal 36 and the quantized difference signal 30 are provided to an adaptive predictor 40.

The primary function of the adaptive predictor 40 is to compute the signal estimate 18 from the quantized difference signal 30. Two adaptive predictor structures are used, a sixth order section that models zeros and a second order section that models poles in the input signal. This dual structure effectively caters for the variety of input signals which might be encountered. Details of the operations of these blocks can be found in section 2.7 of the ITU-T G.726 standard.

As noted above, in block 16, the signal estimate 18 is subtracted from the uniform PCM format input signal 20. It also is provided to adder 32, as previously described.

Figure 1B:
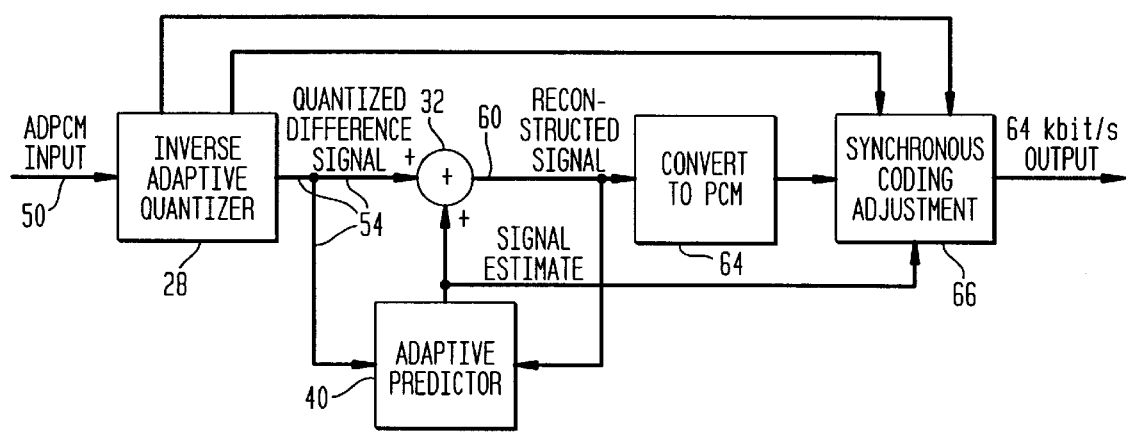
FIG. 1B is a block diagram illustrating the decompression (or decode) operation in accordance with the G.726 international ADPCM standard.

FIG. 1B is a simplified block diagram illustrating the ADPCM decode operation in accordance with the Standard. As can be seen, the encode and decode operations are very similar. In particular, the feedback loop for the decode operation is essentially identical to the feedback loop described above in connection with the encode operation. In particular, the uniform ADPCM coded input signal 50 is provided to an inverse adaptive quantizer 28 which is essentially identical to inverse adaptive quantizer discussed above in connection with FIG. 1A. The quantized difference signal 54 output from the inverse adaptive quantizer 28 is added in block 32 to the signal estimate 56 to produce a reconstructed signal 60. As was the case with respect to the encoding, the reconstructed signal 60 as well as the quantized difference signal 54 are provided to adaptive predictor 40 which generates the aforementioned signal estimate 56. The reconstructive signal is also provided to converter 64 for conversion from uniform PCM into A-law or µ-law PCM, as the case may be. A synchronous coding adjustment is performed in block 66. The synchronous coding adjustment prevents cumulative distortion from occurring on synchronous tandem coding (ADPCM→PCM→ADPCM→etc., digital connections) under certain conditions. The synchronous coding adjustment is achieved by adjusting the PCM output codes in a manner which attempts to eliminate quantizing distortion in the next ADPCM encoding stage.

Figure 2A:
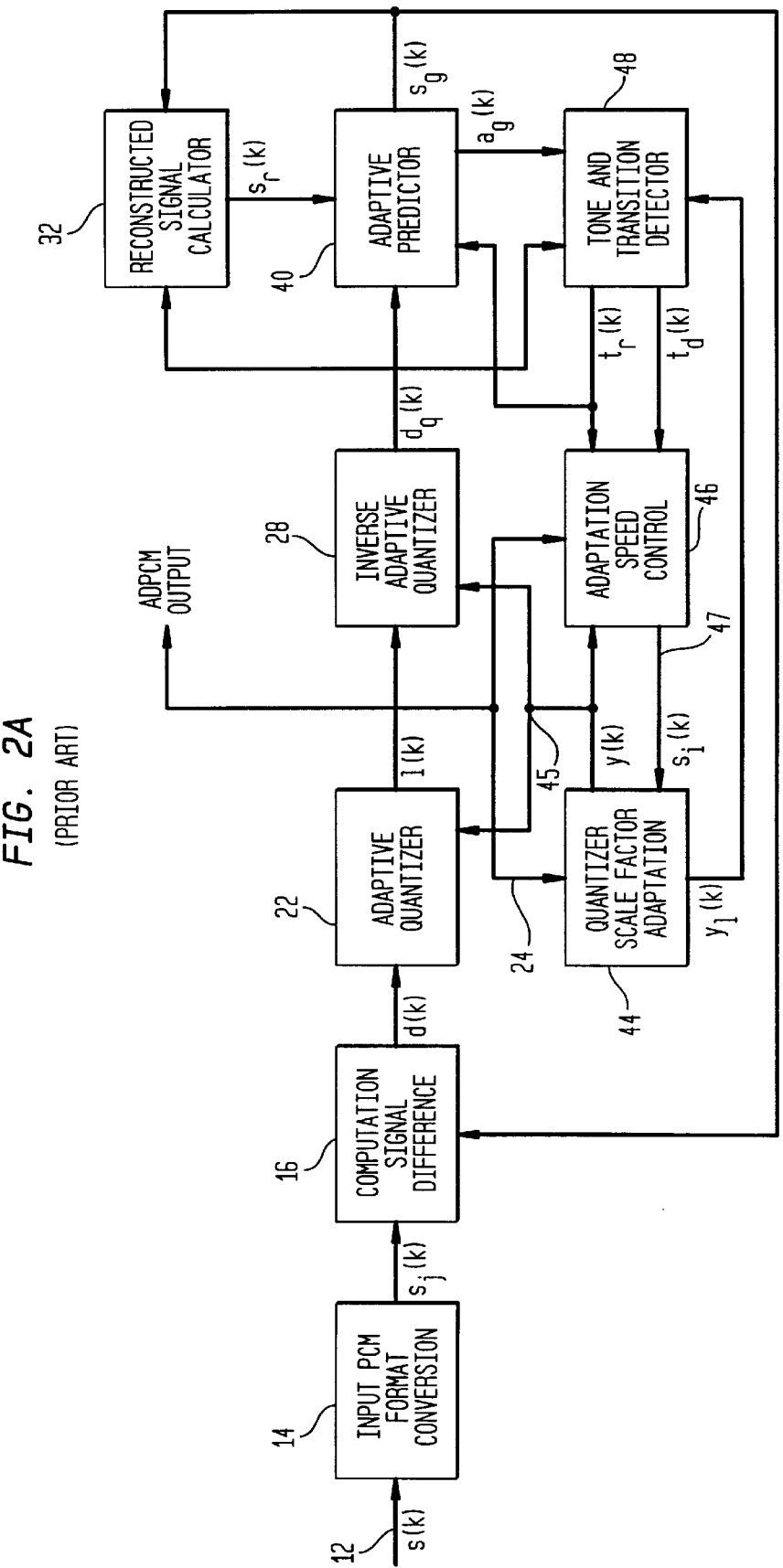
FIG. 2A is a more detailed block diagram illustrating the compression (or encode) operation in accordance with the G.726 international ADPCM standard.

FIG. 2A illustrates the encode operation in slightly more detail. The operations performed in blocks 14, 16, 22, 28, 32 and 40 have already been described.

The quantizer scale factor adaption block 44 computes a scaling factor 45 for the quantizer 22 and the inverse quantizer 28. Its inputs are the ADPCM encoded signal 24 and the adaptation speed control parameter 47. The basic principle used in scaling the quantizers is bi-modal adaptation and is controlled by a combination of fast and slow scale factors. The details of this scaling can be found in the Standard.

The adaptive speed control unit 46 generates the signal 47 which controls the scale factor used in the quantizer scale factor adaptation block 44 and can have a value in the range from 0 to 1. It tends towards unity for speech signals and towards 0 for voice band data signals. It is derived from a measure of the rate of change of the difference signal values.

In order to improve performance for signals originating from frequency shift keyed modems operating in the character mode, a two step detection process is performed in the tone and transition detector block 48.

Figure 2B:
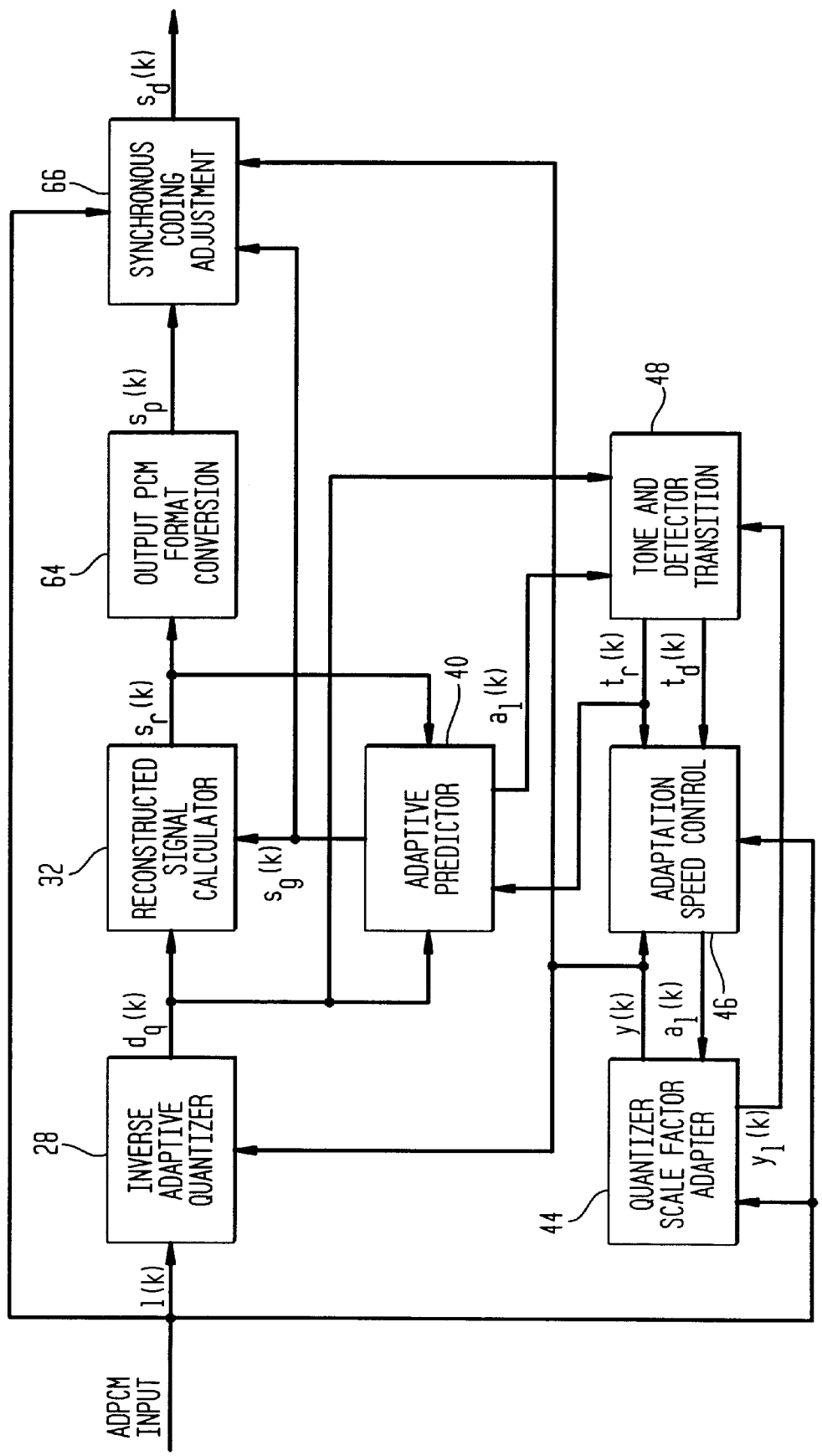
FIG. 2B is a more detailed block diagram illustrating the decompression (or decode) operation in accordance with the G.726 international ADPCM standard.

FIG. 2B is a more detailed block diagram illustrating the decode operation in accordance with ITU-T G.726 Standard. The operation blocks for decoding are substantially similar to those for encoding. Thus, the operations represented by each of the blocks in FIG. 2B have already been described in connection with either FIG. 1B or FIG. 2A.

Figure 3:
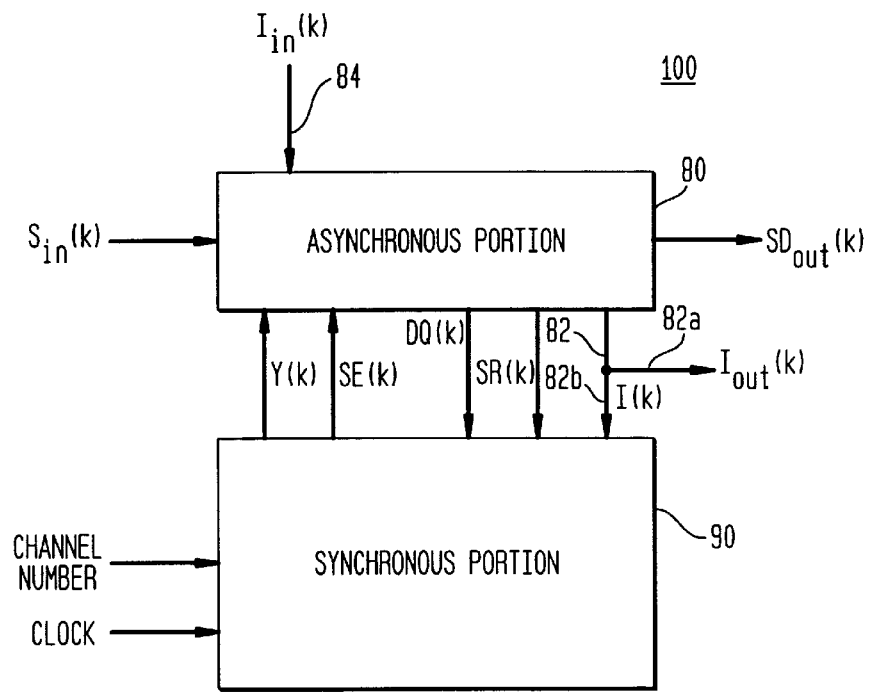
FIG. 3 is a block diagram of an apparatus for performing adaptive differential pulse code modulation in accordance with the present invention.

FIG. 3 broadly illustrates the apparatus of the present invention. In a preferred embodiment of the present invention, the circuitry 100 can be considered to comprise two portions, namely, an asynchronous portion 80 and a synchronous portion 90. The same circuitry is used both for encoding and decoding. The synchronous circuit portion 90 requires fifteen clock cycles per sample to complete its operation. The asynchronous circuit portion 80, as its name implies, operates asynchronously. Accordingly, its operation is completed virtually instantaneously once the proper values are applied to its input terminals. Some of those values are generated in the synchronous circuit portion 90.

The asynchronous circuit portion 80 corresponds to blocks 14, 16, 22, 28, 64, and 66 in FIGS. 1A, 1B, 2A and 2B. All another block functions are performed in the synchronous circuit portion 90 of the circuit.

Figure 4:
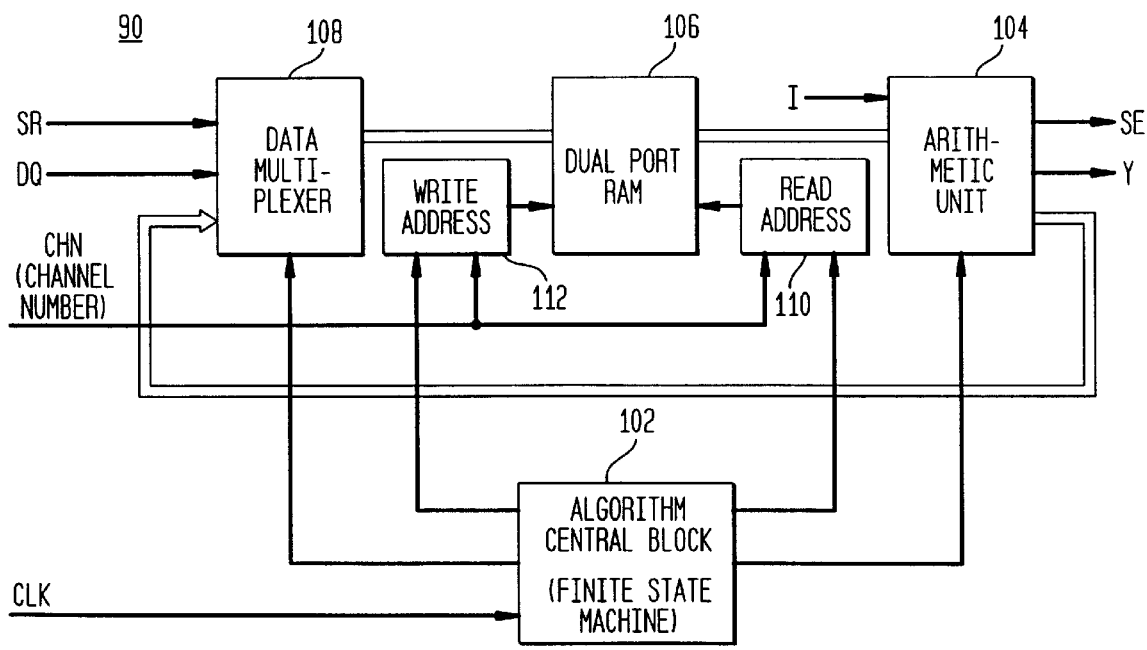
FIG. 4 is a more detailed block diagram of the synchronous circuit portion of the apparatus shown in FIG. 3 in accordance with the present invention.

The synchronous portion 90 of the invention is shown in more detailed block diagram form in FIG. 4. The invention comprises a hardware implementation in which a controller, such as finite state machine 102, controls various other devices as dictated by its state to perform the necessary steps to implement ADPCM encoding or decoding in accordance with the ITU-T G.726 Standard. All logical and mathematical operations are performed by an arithmetic logic unit 104 under control of the finite state machine 102. An incoming compressed signal I is applied directly to the arithmetic logic unit 104.

While the ALU can and does store many intermediate values in memory embodied directly within the ALU, it also has need to use a buffer memory, such as dual port RAM 106, to store certain intermediate values, particularly intermediate variables Y and SE, that will be generated during one pass through the conversion operation, but will be used during a next pass through the conversion operation. The data multiplexer 108 can selectively provide to the write port of the dual port RAM 1) the output of the arithmetic unit, 2) DQ from the asynchronous portion, or 3) SR from the asynchronous portion. The finite state machine 102 has 15 states which are progressively stepped through on each consecutive clock pulse. Read and write address pointer circuits 110 and 112 are under control of the finite state machine 102 to select the appropriate address in the dual port RAM 106 for a given read or write operation. When the device is used in a multi-channel embodiment, the read or write address selected by pointer circuits 110 and 112 also will be a function of a channel number input CHN.

The coded or decoded output I(transmit) or SD is generated from the input signal S or I(receive), respectively, substantially in the asynchronous circuit portion 80. However, as noted, the asynchronous circuit portion 80 needs certain intermediate values generated in the synchronous circuit portion 90. Specifically, the intermediate values Y (the quantizer scale factor) and SE (the signal estimate 18 or 56) are provided from the synchronous portion 90 to the asynchronous portion 80. As will be described in more detail below, intermediate values Y and SE, generated in the synchronous circuit portion 90, are available within one clock cycle of receipt of the sample to which they correspond. Accordingly, the encoded or decoded sample value, I or SD, is available from the asynchronous portion by the second cycle.

Variables Y and SE are available at so early a stage in the conversion (encode or decode) because they were calculated during the pass through the conversion operation corresponding in time to the preceding sample, i.e., before the sample for which they have been generated has even been received by the circuit 100. They were stored in the buffer memory and are written from the memory to the ALU during the first clock cycle after receipt of the corresponding sample. Thus, the remaining 14 clock cycles in the present pass through the finite state machine states are used to calculate intermediate values, most notably Y and SE, for the next pass through the states, i.e., for the next sample.

The asynchronous circuit portion 80 also generates intermediate values DQ (the quantized difference signal 30 or 54 in FIGS. 1A–2B) and SR (the reconstructed signal 36 or 60 in FIGS. 1A–2B), which are needed by the synchronous circuit portion for the calculation of further intermediate values, including Y and SE. It should, therefore, be clear that the values of DQ and SR provided during the first cycle of the current pass through the conversion operation are used in clock cycles 2 through 15 of the current pass through the conversion operation for generating the Y and SE values that for the next sample that has not yet been received. These values for Y and SE will be stored in the buffer memory during the current pass through the conversion operation and will be retrieved during the next pass through the conversion operation for generating the converted output signal.

For example, the input signal S(k) or I(k), where k is the sample number, is available at the beginning of the first clock cycle. Intermediate variables Y(k) and SE(k), inter alia, also are written from the RAM 106 to the ALU 104 during the first clock cycle since they have been previously calculated during the pass through the conversion operation corresponding to the preceding sample, S(k−1) or I(k−1). Thus, the encoded or decoded output signal SD(k) or I(k) is available by the second clock cycle since they are generated in the asynchronous circuit portion. Intermediate values DQ(k+1) and SR(k+1) for the next sample also are generated by the asynchronous circuit portion and, therefore, also are available by the second clock cycle.

Thus, during clock cycles 2 through 15, Y(k+1) and SE(k+1) (i.e., for the next sample) are calculated in the synchronous circuit portion 90.

For sake of clarity and completeness, it should be noted that signal I is calculated and used as an intermediate variable during both the compress and decompress cycles. Accordingly, a value for I always is generated. Of course, during a decompress (decode) cycle, I is used only internally in the feedback loop as an intermediate value and not as a circuit output. In particular, referring to FIGS. 2A and 2B, I is used as an intermediate variable by the quantizer scale factor adaptation block 44 and the adaptation speed control block 46 during both compression and decompression. During a decompress cycle, I is available directly from the input 50. However, during a compress cycle, I is obtained from the output of the adaptive quantizer 22.

Table 1 below illustrates the 15 clock cycle calculation sequence as controlled by the finite state machine 102.

Table 1

1) load previously calculated numbers plus I, DQ, SR into registers.
2) TRANS(TD, YL,DQ)→TR
3) TRIGB(TR,UPB(B6,DQ,XOR(DQ,DQ6)))→B6a
4) B6a→B6; DQ5→DQ6
5) B5; DQ4→DQ5
   FMLT(B5,DQ4)→ACCUM
   TRIGB(TR,UPB(B4,DQ,XOR(DQ,DQ4)))→B4a
6) B4a→B4; DQ3→DQ4
   FMULT(B4,DQ3)→ACCUM
   TRIGB(TR,UPB(B3,DQ,XOR(DQ,DQ3)))→B3a
7) B3a→B3; DQ2→DQ3
   FMULT(B3,DQ2)→ACCUM
   TRIGB(TR,UPB(B2,DQ,XOR(DQ,DQ2)))→B2a
8) B2a→B2; DQ1→DQ2
   FMULT(B2,DQ1)→ACCUM
   TRIGB(TR,UPB(B1,DQ,XOR(DQ,DQ1)))→B1a
9) B1a→B1; FLOAT(DQ0)→DQ1
   FMULT(B1,DQ0)→ACCUM
   ADDC(SEZ(value from previous sample),DQ)→PK0, SIGPK
10) ACCUM→SEZ (for next sample)
11) Calculate new A2 (=old A2R) from old
    A2, SIGPK,PK0,PK1,PK2,TR
    Calculate new A1 (=old A1R) from old A1,SIGPK,PK0, PK1,TR
    FMULT(A2R,SR1)→WA2 (for next sample)
    PK0→PK1; PK1→PK2
12) SR0→SR1
    FMULT(A1R,SR0)→WA1 (for next sample)
    FUNCTF(I)→FIa
    FILTA(DMS,FLa)→DMS(next sample);
    FILTA(DML,FIa)→DML(next sample);
13) Calculate AP and AL from DMS, DML, Y, TDP, TR
14) LIMB(FILTD(Y,FUNCTW(I)))→YUPa
    FILTE(YUPa,YL)→YLP (YL for next sample)
    MIX(YUP,YLP,LIMA(AP))→Ya (for next sample)
15) ACCUM→SE; TRIGB(TDP,TR)→TD (for next sample)
    Ya→Y Each of steps 1 through 15 corresponds to a state of the finite state machine 102 and, therefore, also to a clock cycle. State 1 is entered upon receipt of an input sample S or I(receive). All of the functions and variables set forth in Table 1 are defined in the ITU-T G.726 Standard and, therefore, are not described in detail herein. An "a" at the end of a variable name indicates that the value assigned to the variable during that cycle is an intermediate version of the value, not the final value of that variable. Also, an arrow from one variable to another indicates that the variable on the left-hand side is replacing the variable on the right-hand side, i.e., is being stored in the memory location in the dual port memory or the ALU register corresponding to that variable.

Table 1 shows only the calculations with respect to the synchronous circuit portion 90 and, therefore, does not show operation relating to the generation of the output signal, SD or I(transmit). It should be understood that other operations are being performed in each cycle that are not shown in Table 1.

During the first clock cycle (i.e., first finite state machine state), the intermediate values Y and SE calculated in the previous iteration through the fifteen cycle sequence are retrieved from the dual port RAM and provided to ALU registers. Also during the first clock cycle, values for intermediate variables I, DQ, and SR are obtained from the asynchronous portion of the circuit 80; the transmission delay through the asynchronous circuitry being sufficiently small that these variables are available to the synchronous circuit portion during the first clock cycle.

In accordance with ITU-T G.726, intermediate variables Y. SE, I, SR and DQ as well as the actual current input sample S or I(receive), are needed to calculate the encoded or decoded output signal, I or SD. All of these variables are available during the first clock cycle. Specifically, (1) the input sample S or I(receive) is available during the first clock cycle, (2) Y and SE are retrieved from the dual port RAM during the first clock cycle, and (3) I, SR and DQ are generated by the asynchronous circuitry during the first clock cycle. Thus, since the converted output SD or I(transmit) for the present sample is generated in the asynchronous circuit portion, it is available essentially immediately after the aforementioned intermediate variables become available (the only delay being the transmission delay through the asynchronous circuitry). Thus, the converted output is available within one clock cycle of the receipt of the corresponding sample. As noted above, in order not to obfuscate the description, Table 1 illustrates only the synchronous circuit portion operation. Therefore, the generation of the converted output signal I(transmit) or SD is not reflected in Table 1.

Thus, starting with clock cycle/state 2, the synchronous circuit operation reflected in Table 1 relates to calculation of the intermediate variables for the next sample. In cycle 12, the TRANS function (defined in the Standard) is performed on inputs TD, YL, and DQ to generate output TR. The TRANS function is a transition detector function for detecting the individual bit transactions. Variable TR is stored to the dual port RAM during cycle 2.

In cycles/states 3 through 9, the FMULT and TRIGB functions are iterated for the sixth order predictor coefficients DQ1–DQ6. Also, the intermediate variables B1–B6 and DQ1–DQ6 are stored to the dual port RAM. Additionally, in cycle/state 9, the ADDC function obtains a sign for the sum of the quantized difference signal 30 or 54 and the partial signal estimate 18 or 56. These variables, PKO and SIGPK, are also stored to the dual port RAM during cycle 9.

In a preferred embodiment of the invention, the dual port RAM has a word length substantially greater than the lengths of intermediate variables that are to be stored therein. Thus, multiple variables can be stored in a single write cycle by simply appending variables together to create a single word for storage that actually comprises several of the intermediate variables that need to be stored in the dual port RAM.

In cycle/state 10, the calculated value of SEZ (the sixth order predictor signal estimate) from the final FMULT operation is loaded from the accumulator of the ALU 104 to the memory location in the dual port RAM 106 corresponding to variable SEZ for the present channel.

In cycle/state 11, the second order prediction is started and the partial product of the signal estimate, WA2, for the next sample is stored in the dual port RAM 106.

In cycle/state 12, the reconstructed signal with delay 0, SR0, is substituted for the reconstructed signal with delay 1, SR1. Also, the second order prediction is completed and values for intermediate values WA1, FIa, DMS and DML for the next sample are generated. Also, WA1, DMS and DML are stored to the dual port RAM.

In cycle/state 13, values for variables AP and AL, i.e., the delayed unlimited speed control parameter and the limited speed control parameter (see block 46 in FIGS. 2A and 2B) are calculated from DMS, DML, Y, TDP, and TR and written to the dual port RAM.

Next, in cycle/state 14, the quantizer scale factor Y (see block 44 in FIGS. 2A and 2B) for the next sample is determined. The quantizer scale factor Y is shown as an intermediate value, Ya, because, in step 14, it is stored to an ALU register, rather than to the dual port RAM. However, the value of Ya calculated in this step is the final value of Y. Ya will be written from the ALU register to the dual port RAM in step 15 for reasons that will be explained below.

Finally, in cycle/state 15, the signal estimate SE from the accumulator is written to the dual port RAM 106. SE is the signal estimate 24 or 55 in FIGS. 1A and 1B. Also in this step, the delayed tone detect value TD (see block 48 in FIGS. 2A and 2B) is calculated and written to the dual port RAM 106. Both of these values SE and TD are for use in connection with the next sample for this channel.

The reason that Y is written to the dual port RAM in step 15 rather than step 14 is that both Y and SE are read from the dual port RAM in step 1 so that the asynchronous circuit portion can calculate the output signal. Accordingly, Y and SE are stored at the same word location in the dual port RAM so that both values can be retrieved in a single read operation since only one read from the buffer memory can be performed per cycle. Accordingly, Y is saved in an ALU register until step 15 and Y and SE are written to the dual port RAM in a single write operation in step 15.

Although not expressly mentioned in the above-description of steps 1 through 15, it should be apparent that many of the variables needed to perform the mathematical operations in those steps utilized the variables that were stored in the dual port RAM during the previous 15 cycle iteration through the state machine states. For instance, in step 2, the previously stored variable TD which is needed to perform the TRANS mathematical operation is retrieved from the dual port RAM before the operation is performed. As noted, TR was generated and stored to the RAM in cycle 15 of the previous pass through the states of the state machine.

Thus, it can be seen that the output signal 24 or 27, (depending on whether it is an encode or decode operation) is determined for each sample in only fifteen clock cycles and is available by the second clock cycle after the sample to which it pertains is received. As described, the entire synchronous operation for calculating the intermediate variables corresponding to a next sample are calculated prior to the receipt of the sample to be converted. The architecture is extremely simple, comprising a controller such as finite state machine 102, an ALU 104, a buffer memory such as dual port RAM 106, and related circuitry 108 and 110 for addressing the memory, and a multiplexer 112 for providing multiple data paths into the write port of the memory 106.

The use of a buffer memory allows for a single hardware setup to be used for any number of data channels. No modification of the hardware is needed to adapt to multiple channel use. It only is necessary for the memory to have sufficient space to store, for all of the channels, the intermediate values which are generated during a first pass through the conversion operation, but which are needed for the next pass through the operation for the corresponding channel.

The use of a dual port RAM as the buffer memory in the preferred embodiment allows both a write and read from memory to occur during a single clock cycle. This feature helps minimize the overall number of clock cycles needed per conversion.

Even further, the use of a dual port RAM provides for the option to read from the memory asynchronously, which, in turn, provides the opportunity to compute certain data in only half a clock cycle.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. The foregoing description is by way of example only, and not limiting. The invention is limited only as defined in the following claims and equivalents thereto.

The invention claimed is:

1. An apparatus for performing adaptive differential pulse code modulation on a plurality of successive digital input samples comprising:

a processor for performing arithmetic and logical operations;

a memory coupled to said processor for storing data; and a controller coupled to said processor and said memory and configured to cause said processor to convert a digital input sample to an output signal in accordance with adaptive differential pulse code modulation using intermediate values stored in said memory and to calculate said intermediate values for a subsequent sample and to store said intermediate values for said subsequent sample in said memory.

2. An apparatus as set forth in claim 1 wherein said memory is a dual port random access memory.

3. An apparatus as set forth in claim 2 wherein said apparatus operates in conformity with the ITU-T G.726 international standard.

4. An apparatus as set forth in claim 3 wherein said apparatus comprises an asynchronous circuit portion and a synchronous circuit portion and wherein:

said synchronous circuit portion comprises said memory, said processor and said controller and generates, in a period between receipt of each digital input sample and receipt of a next digital input sample, a signal estimate corresponding to said next digital input sample; and said asynchronous circuit portion comprises circuitry for generating said output signal corresponding to each digital input sample, said output signal being a function of a difference between said digital input sample and said corresponding signal estimate.

5. An apparatus as set forth in claim 4 wherein:

said synchronous circuit portion further generates, in said period, a quantizer scale factor corresponding to said next digital input sample; and said asynchronous circuit portion further comprises circuitry for quantizing each said difference as a function of said corresponding quantizer scale factor to generate said output signal.

6. An apparatus as set forth in claim 4 wherein said quantizer scale factor and said signal estimate are stored in said memory during said period.

7. An apparatus as set forth in claim 6 wherein said controller comprises a finite state machine.

8. An apparatus as set forth in claim 7 wherein said period comprises a plurality of clock cycles and wherein said asynchronous circuit portion generates said output signal corresponding to a digital input sample during a first clock cycle after receipt of said corresponding digital input sample.

9. An apparatus as set forth in claim 8 wherein said output signal is generated within one clock cycle after receipt of said corresponding digital input sample.

10. An apparatus as set forth in claim 8 wherein said asynchronous circuit portion further generates a reconstructed signal and a quantized difference signal corresponding to said digital input sample during said first clock cycle after receipt of said corresponding digital input sample.

11. An apparatus as set forth in claim 10 wherein said quantizer scale factor and said signal estimate are read from said memory during said first clock cycle after receipt of said corresponding digital input sample.

12. A method of performing adaptive differential pulse code modulation on a plurality of successive digital input samples to generate a converted output signal corresponding to each said digital input sample, said method comprising the steps of:

(1) retrieving from a memory during a period between receipt of first and second successive digital input samples, intermediate values needed for generating said converted output signal;

(2) generating, during said period, said converted output signal corresponding to said first digital input sample;

(3) generating, during said period, intermediate values needed for calculating said converted output signal for said second digital input sample; and (4) storing, during said period, said intermediate values in said memory.

13. A method as set forth in claim 12 wherein said method of performing adaptive differential pulse code a modulation is in conformity with the ITU-T G.726 international standard.

14. A method as set forth in claim 13 wherein one of said intermediate values is a signal estimate corresponding to said second digital input sample and wherein:

step (2) includes the step of calculating a difference between said first digital input sample and a signal estimate corresponding to said first digital input sample; and step (3) includes the step of generating said signal estimate corresponding to said second digital input sample.

15. A method as set forth in claim 14 wherein:

step (2) further comprises quantizing each said difference as a function of a corresponding quantizer scale factor to generate said output signal; and step (3) further comprises generating a quantizer scale factor corresponding to said second digital input sample.

16. A method as set forth in claim 15 wherein step (4) comprises storing said quantizer scale factor and said signal estimate corresponding to said second digital input sample.

17. A method as set forth in claim 16 wherein said period comprises a plurality of clock cycles and step (1) is performed during a first clock cycle after receipt of said first digital input sample.

18. A method as set forth in claim 17 wherein step (2) is completed within one clock cycle of receipt of said first digital input sample.

19. A method as set forth in claim 18 wherein step (3) further comprises generating a reconstructed signal and a quantized difference signal corresponding to said second digital input sample during said first clock cycle.

20. A method as set forth in claim 19 wherein step (1) comprises retrieving said quantizer scale factor and said signal estimate corresponding to said first digital input sample from said memory during said first clock cycle.

21. A method as set forth in claim 12 wherein said period comprises a plurality of clock cycles and step (2) is completed within one clock cycle of receipt of said first digital input sample.

22. A method of performing adaptive differential pulse code modulation in accordance with the ITU-T G.726 international standard for a plurality of successive digital input samples to generate a converted output signal corresponding to each said digital input sample during a period between receipt of a current digital input sample and receipt of a next digital input sample, said method comprising the steps of:

(1) retrieving from a dual port random access memory a signal estimate corresponding to said current sample;

(2) retrieving from said dual port random access memory a quantizer scale factor corresponding to said current sample;

(3) generating a difference signal between said current sample and said signal estimate;

(4) determining a quantized difference signal from said difference signal using said quantizer scale factor, said quantized difference signal comprising said converted output signal;

(5) generating for said next digital input sample said signal estimate;

(6) generating for said next digital input sample said quantized difference signal; and (7) storing said signal estimate and said quantized difference signal for said next digital input sample in said dual port random access memory.

23. A method as set forth in claim 22 wherein said period comprises a plurality of clock cycles and steps (1) and (2) are performed during a first clock cycle after receipt of said current digital input sample.

24. A method as set forth in claim 23 wherein steps (3) and (4) are completed within one clock cycle of receipt of said current digital input sample.

25. A method as set forth in claim 24 further comprising the step of:

(3.1) generating a reconstructed signal corresponding to said digital input sample during said first clock cycle after receipt of said current digital input sample.

* * * * *